(12) United States Patent
Kimura et al.

(10) Patent No.: US 9,806,520 B2
(45) Date of Patent: Oct. 31, 2017

(54) INRUSH CURRENT LIMITING CIRCUIT

(71) Applicants:Yazaki Corporation, Minato-ku, Tokyo (JP); National Institute of Advanced Industrial Science and Technology, Tokyo (JP)

(72) Inventors: Osamu Kimura, Susono (JP); Tsutomu Yatsuo, Tsukuba (JP); Yasunori Tanaka, Tsukuba (JP)

(73) Assignees: Yazaki Corporation, Tokyo (JP); National Institute of Advanced Industrial Science and Technology, Tokyo (JP)

( * ) Notice: Subject to any disclaimer, the term of this patent is extended or adjusted under 35 U.S.C. 154(b) by 89 days.

(21) Appl. No.: 15/054,593

(22) Filed: Feb. 26, 2016

(65) Prior Publication Data

US 2016/0181794 A1 Jun. 23, 2016

Related U.S. Application Data

(63) Continuation of application No. PCT/JP2014/072471, filed on Aug. 27, 2014.

(30) Foreign Application Priority Data

Aug. 27, 2013 (JP) .................................. 2013-175257
Jun. 12, 2014 (JP) .................................. 2014-121496

(51) Int. Cl.
*H02H 9/08* (2006.01)
*H02H 9/02* (2006.01)
*H02H 9/00* (2006.01)

(52) U.S. Cl.
CPC ............ *H02H 9/025* (2013.01); *H02H 9/001* (2013.01); *B60L 2270/20* (2013.01); *H02H 9/002* (2013.01); *H02H 9/004* (2013.01); *Y10S 323/908* (2013.01)

(58) Field of Classification Search
USPC ....................................... 361/93.1, 93.7–93.9
See application file for complete search history.

(56) References Cited

U.S. PATENT DOCUMENTS

| 6,735,064 B2 * | 5/2004 | Miyazaki | ................ G05F 2/652 323/299 |
| 2007/0091528 A1 * | 4/2007 | Yamashita | ............ B60L 3/0046 361/93.1 |

FOREIGN PATENT DOCUMENTS

| JP | 2005-102471 A | 4/2005 |
| JP | 4123441 B2 | 7/2008 |
| JP | 2010-220325 A | 9/2010 |

OTHER PUBLICATIONS

Oct. 28, 2014—International Search Report—Intl App PCT/JP2014/072471.

* cited by examiner

*Primary Examiner* — Danny Nguyen
(74) *Attorney, Agent, or Firm* — Banner & Witcoff, Ltd.

(57) ABSTRACT

A current command value in a period from a time when a relay switch is turned on until charging of an inverter capacitor is completed is set to a value smaller than a value corresponding to the smallest one of rated currents of components included in a circuit, and is set to a value smaller than a maximum current value in a safe operating area of a switching element.

5 Claims, 8 Drawing Sheets

INRUSH CURRENT LIMITING CIRCUIT

CROSS REFERENCE TO RELATED APPLICATIONS

This application is a continuation of PCT application No. PCT/JP2014/072471, which was filed on Aug. 27, 2014 based on Japanese patent application No. 2013-175257 filed on Aug. 27, 2013 and Japanese patent application No. 2014-121496 filed on Jun. 12, 2014, whose contents are incorporated herein by reference. Also, all the references cited herein are incorporated as a whole.

BACKGROUND OF THE INVENTION

1. Technical Field

The present invention relates to an inrush current limiting circuit.

2. Background Art

In a case where a smoothing capacitor having a large capacity is connected in parallel to an electrical load, an inrush current limiting circuit for reducing an inrush current flowing into the smoothing capacitor from a battery in supplying a power from the battery o the electrical load has been conventionally proposed. The inrush current limiting circuit includes a first connecting line for connecting a positive terminal of the battery and the electrical load to each other, a second connecting line for connecting a negative terminal of the battery and the electrical load to each other, switches respectively provided on the first and second connecting lines, and a current limiting circuit connected in parallel to each of these switches.

The current limiting circuit includes a switching element, a precharge resistor and a leakage current detection circuit, and when the power supply to the electrical load is started, the switch and the switching element provided on the second connecting line are first turned on. As a result, the smoothing capacitor is charged slowly via the precharge resistor, so that an inrush current can be suppressed (see Japanese Patent No. 4123441).

SUMMARY

In the inrush current limiting circuit described in Japanese Patent No. 4123441, however, it is necessary to provide the switches respectively on the first and second connecting lines, and to provide the switching element and the precharge resistor, which unavoidably complicates the configuration.

The present invention was accomplished to solve this problem, and an object of the present invention is to provide an inrush current limiting circuit capable of preventing a component from being damaged by an inrush current while preventing complication of the configuration.

Solution to Problem

The inrush current limiting circuit of the present invention includes: a first connecting line connecting a positive terminal of a battery and an electrical load to each other; a second connecting line connecting a negative terminal of the battery and the electrical load to each other; a capacitor having one electrode connected to the first connecting line, and another electrode connected to the second connecting line; a switch provided on a first line out of the first and the second connecting lines; and a current limiting circuit provided on a second line out of the first and second connecting lines, and the current limiting circuit includes: a current sensor provided on the second line; an operational amplifier receiving, at an inverting input terminal, a signal in accordance with a detection value obtained by the current sensor, and receiving a current command value at a non-inverting input terminal; and a switching element provided on the second line, receiving an output signal from the operational amplifier at a control terminal, and performing a switching operation in accordance with the output signal, and in a period from time when the switch is turned on until charging of the capacitor is completed, the current command value is set to a value smaller than a value corresponding to a smallest one of rated currents of components included in the circuit, and set to a value smaller than a maximum current value in a safe operating area of the switching element.

In the inrush current limiting circuit, the current command value is set to a value smaller than the value corresponding to the smallest one of the rated currents of the components included in the circuit in the period from the time when the switch is turned on until the charging of the capacitor is completed. Therefore, owing to the characteristic of the operational amplifier to adjust values on both the terminals to be equivalent to each other, the detection value of the current sensor is adjusted by the switching element to be equivalent to the current command value, and hence, the components are prevented from being damaged by an inrush current in the period until the charging of the capacitor is completed. In addition, since the current limiting circuit is provided on the second line out of the first and second connecting lines, there is no need to provide the switch in a plural number, and the switch is provided on merely one of the first and second connecting lines. Accordingly, the damage of the components otherwise caused by an inrush current can be prevented while preventing the complication of the configuration. Besides, since the current command value is set to a value smaller than the value corresponding to the maximum current value in the safe operating area of the switching element, a second breakdown phenomenon does not occur in the switching element, so that the switching element can be efficiently used.

Alternatively, the inrush current limiting circuit of the present invention includes: a first connecting line connecting a positive terminal of a battery and an electrical load to each other; a second connecting line connecting a negative terminal of the battery and the electrical load to each other; a capacitor having one electrode connected to the first connecting line, and another electrode connected to the second connecting line; a switch provided on a first line out of the first and the second connecting lines; and a current limiting circuit provided on a second line out of the first and second connecting lines, and the current limiting circuit includes: a current sensor provided on the second line; an operational amplifier receiving, at an inverting input terminal, a signal in accordance with a detection value obtained by the current sensor, and receiving a current command value at a non-inverting input terminal; and a switching element provided on the second line, receiving an output signal from the operational amplifier at a control terminal, and performing a switching operation in accordance with the output signal, and the switching element is a silicon carbide static induction transistor.

In the inrush current limiting circuit, for using a silicon carbide static induction transistor in an active region, it is more preferable to use a static induction transistor than a MOSFET having a gate oxide film.

In the inrush current limiting circuit, a product of a current value flowing through the switching element and a voltage difference between ends of the switching element is preferably set to a constant value.

In the inrush current limiting circuit, the current command value is set so that the product of the current value flowing through the switching element and the voltage difference between the ends of the switching element can be constant. Therefore, a state, as in a case where the current command value is a constant value, where the power of the switching element is high in the first half of the period from the time when the switch is turned on until the charging of the capacitor is completed and is low in the second half can be avoided, and the power can be made substantially constant through the whole period. Accordingly, the excessive (wasteful) performance of the rated power of the switching element can be avoided, and it is possible to achieve at least one of suppression of the rated power of the switching element and shortening of a period necessary for completing the charging of the capacitor.

Furthermore, the inrush current limiting circuit of the present invention preferably further includes: a voltage sensor detecting the voltage difference between the ends of the switching element; and an operator calculating, on the basis of a signal from the voltage sensor and a signal from the current sensor, the current command value for making constant the product of the current value flowing through the switching element and the voltage difference between the ends of the switching element, and outputting the calculated current command value to the non-inverting input terminal of the operational amplifier.

In the inrush current limiting circuit, since the operator, which calculates, on the basis of the signals from the voltage sensor and the current sensor, the current command value for making constant the product of the current value and the voltage value of the switching element, and outputs the calculated current command value to the non-inverting input terminal of the operational amplifier, is provided, a current command value can be calculated by actually monitoring a voltage difference of the switching element, and for example, it is possible to cope with the change or the like of resistance values of the respective components depending on the temperature environment where the inrush current limiting circuit is used, and hence, the power applied to the switching element can be more precisely retained constant.

Besides, the inrush current limiting circuit of the present invention preferably further includes a determination section determining, on the basis of the signal from the voltage sensor, whether or not the charging of the capacitor has been completed, and if it is determined by the determination section that the charging of the capacitor has been completed, the operator places the switching element in a completely on state by changing the current command value to be higher than in the period from the time when the switch is turned on until the charging of the capacitor is completed.

In the inrush current limiting circuit, since the determination section determining the completion of the charging of the capacitor is provided, there is no need to determine the completion of the charging of the capacitor on the basis of the elapse of time, and the determination can be made on the basis of an actual voltage difference of the switching element, so that the switching element can be placed in a completely on state at more precise timing.

The present invention can provide an inrush current limiting circuit capable of preventing a component from being damaged by an inrush current while preventing complication of the configuration.

BRIEF DESCRIPTION OF THE DRAWINGS

FIG. 5A and FIG. 5B are diagrams illustrating a power in the inrush current limiting circuit of the embodiment, wherein FIG. 5A illustrates a drain voltage and a drain current and FIG. 5B illustrates the power.

FIG. 6A and FIG. 6B are diagram illustrating a power in the inrush current limiting circuit of the modification, wherein FIG. 6A illustrates a first example and FIG. 6B illustrates a second example.

DETAILED DESCRIPTION OF EMBODIMENTS

Figure 1:
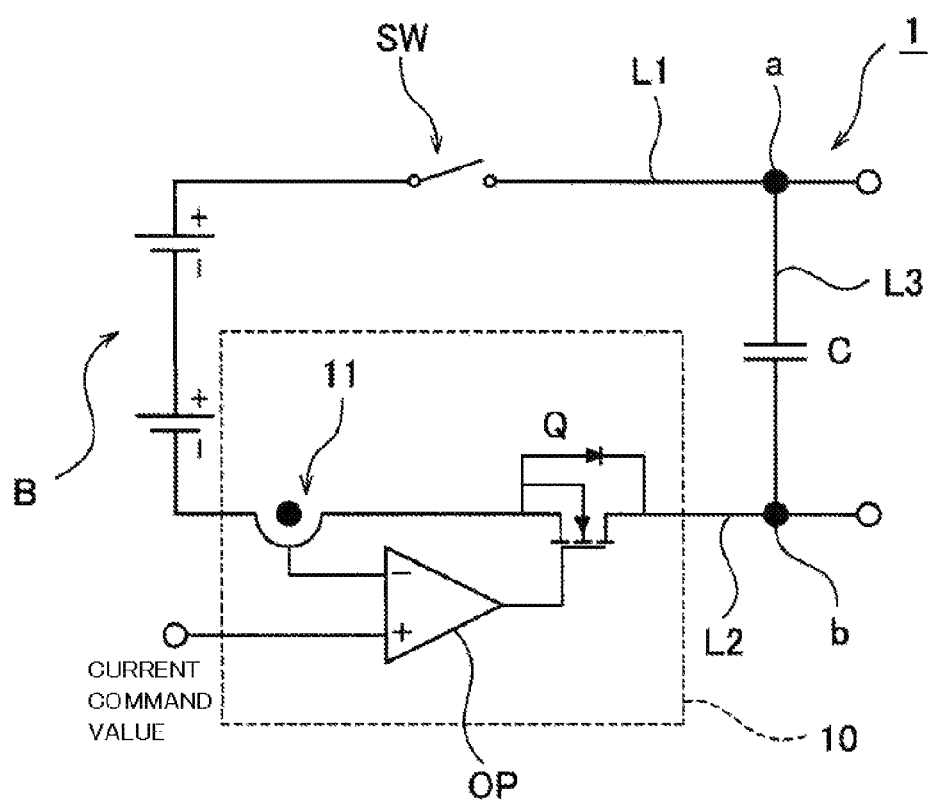
FIG. 1 is a circuit diagram illustrating an example of an inrush current limiting circuit according to an embodiment of the present invention.

A preferable embodiment of the present invention will now be described on the basis of the accompanying drawings, and it is noted that the present invention is not limited to the following embodiment. FIG. 1 is a circuit diagram illustrating an example of an inrush current limiting circuit according to the embodiment of the present invention.

The inrush current limiting circuit 1 of the present embodiment is one provided in a power supply system for supplying a power to an electrical load (such as an inverter) of a hybrid vehicle or an electric vehicle, and as illustrated in FIG. 1, includes a first connecting line L1, a second connecting line L2, an inverter capacitor (capacitor) C, a relay switch (switch) SW and a current limiting circuit 10.

The first connecting line L1 connects a positive terminal of a battery B and the electrical load to each other, and the second connecting line L2 connects a negative terminal of the battery B and the electrical load to each other. The inverter capacitor C is provided on a third connecting line L3 connecting the first connecting line L1 and the second connecting line L2 to each other, and has one electrode connected to the first connecting line L1 and the other electrode connected to the second connecting line L2. Hereinafter, a connecting point between the first connecting line L1 and the third connecting line L3 is designated as a first node "a", and a connecting point between the second connecting line L2 and the third connecting line L3 is designated as a second node "b".

The relay switch SW is provided on the first connecting line L1 in a portion between the battery B and the first node "a", so as to be turned on in supplying a power to the electrical load and turned off in cutting off the power supply. The current limiting circuit 10 is provided on the second connecting line L2 in a portion between the battery B and the second node "b", so as to limit an inrush current occurring in turning on the relay switch SW.

This current limiting circuit 10 includes a current sensor 11, an operational amplifier OP and a switching element Q. The current sensor 11 is provided on the second connecting line L2, so as to output a voltage signal in accordance with a detection value to a non-inverting input terminal of the operational amplifier OP, and for example, a shunt resistor is used. The operational amplifier OP receives, at an inverting input terminal, the voltage signal in accordance with the detection value of the current sensor 11, and receives a current command value at the non-inverting input terminal.

The switching element Q is, specifically, a silicon carbide static induction transistor (SiC-SIT), whose gate (control terminal) is connected to the output of the operational amplifier OP so as to perform a switching operation in accordance with an output signal of the operational amplifier OF input to the gate. This switching element Q has a drain connected to the second node "b" and a source connected to a side of the current sensor 11. Incidentally, the switching element Q is not limited to the silicon carbide static induction transistor but may be a MOSFET, an IGBT, a bipolar transistor or the like.

Besides, in a period from a time when the relay switch SW is turned on until the charging of the inverter capacitor C is completed, the current command value input to the non-inverting input terminal of the operational amplifier OP in the present embodiment is set to a voltage value smaller than a voltage value corresponding to the smallest one of rated currents of the components (such as the relay switch SW and the inverter capacitor C) included in the inrush current limiting circuit 1.

Here, owing to the characteristic of the operational amplifier OP to adjust values on the both terminals to be equivalent, the detection value of the current sensor 11 is adjusted to be equivalent to the current command value by the switching element Q. Therefore, in the period until the charging of the inverter capacitor C is completed, a current flowing through the second connecting line L2 is adjusted, so that the components can be prevented from being damaged by an inrush current.

Figure 2:
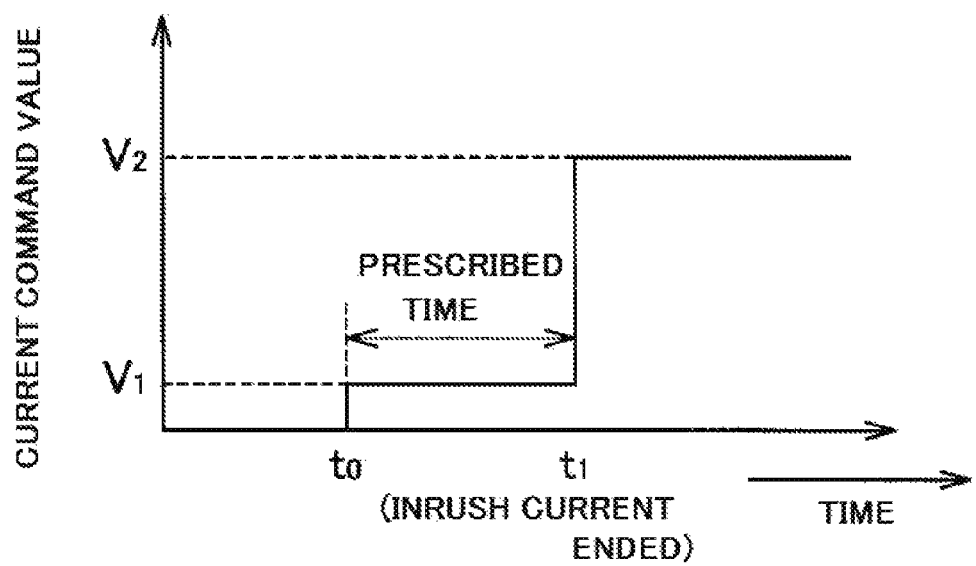
FIG. 2 is a diagram explaining an operation of the inrush current limiting circuit of the embodiment, in which a current command value input to a non-inverting input terminal of an operational amplifier is illustrated.

Next, the operation of the inrush current limiting circuit 1 of the present embodiment will be described. FIG. 2 is a diagram explaining the operation of the inrush current limiting circuit 1 of the present embodiment, and illustrates the current command value input to the non-inverting input terminal of the operational amplifier OP.

First, when the relay switch SW is turned on at time t0, the current command value is set to V1. Then, at time t1 after prescribed time elapse, the current command value is changed to V2 (>V1). Thereafter, the current command value is retained at V2.

Here, as described above, the current command value V1 is set to the voltage value smaller than the voltage value corresponding to the smallest one of the rated currents of the components included in the inrush current limiting circuit 1. More specifically, the current command value V1 is set to a value smaller than a voltage value corresponding to the maximum current value in a safe operating area (SOA) of the switching element Q. Specifically, the current command value V1 is set to 0.1 V. Thus, the switching element Q is controlled so that a current measured as 0.1 V by the current sensor 11 can flow.

Besides, the current command value V2 is set to a value sufficiently large as compared with a current value flowing through the second connecting line L2 in a normal period (corresponding to a stage where a desired power is supplied to the electrical load after completing an inrush current limiting period), and is set to a value for completely turning on the switching element Q.

Furthermore, the prescribed time from time t0 to time t1 is set to a time necessary for eliminating the inrush current, or a time longer than this necessary time, and specifically is set to about 0.2 second.

Figure 3:
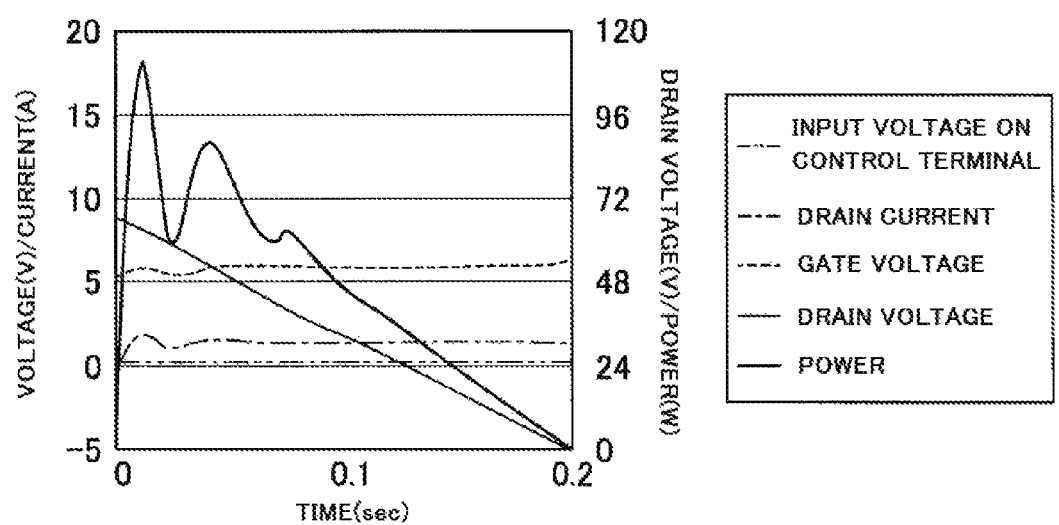
FIG. 3 is a diagram explaining the operation of the inrush current limiting circuit of the embodiment, in which a current value, a voltage value and the like are illustrated.

Next, the operation of the inrush current limiting circuit 1 of the present embodiment will be described in more detail with reference to FIG. 3, FIG. 3 is a diagram explaining the operation of the inrush current limiting circuit 1 of the present embodiment, in which a current value, a voltage value and the like are illustrated.

First, it is assumed that the relay switch SW is turned on at Time 0 sec. The current command value is set to V1 (0.1 V), and the switching element Q is controlled so that a current measured as 0.1 V by the current sensor 11 can flow. As a result, immediately after turning on the relay switch SW, a drain current of about 1.5 A flows, and a drain voltage of about 70 V is applied. Besides, a power corresponds to a product of the drain current and the drain voltage, which instantaneously becomes about 110 W. It is noted that the gate voltage at this point is about 6 V.

Next, at Time 0.05 sec, the drain voltage is lowered to about 50 V. Therefore, the power is also lowered to about 75 W.

The drain voltage is also lowered thereafter, and before Time 0.2 sec, the drain voltage becomes 0 V, and hence the power becomes 0 W. At this time point, the charging of the inverter capacitor C is completed, and an occurrence period of an inrush current has ended.

Thereafter, although not illustrated in the drawing, the current command value is changed to V2, and the switching element Q is placed in a completely on state.

In this manner, in the inrush current limiting circuit 1 of the present embodiment, the current command value is set to a value smaller than the value corresponding to the smallest one of the rated currents of the components included in the inrush current limiting circuit 1 in the period from the time when the relay switch SW is turned on until the charging of the inverter capacitor C is completed. Therefore, owing to the characteristic of the operational amplifier OP to adjust values on both the terminals to be equivalent to each other, the detection value of the current sensor 11 is adjusted by the switching element Q to be equivalent to the current command value, and hence, the components are prevented from being damaged by an inrush current in the period until the charging of the inverter capacitor C is completed. In addition, since the current limiting circuit 10 is provided on the second connecting line L2, there is no need to provide the relay switch SW in a plural number, and the relay switch SW is provided on the second connecting line L2 alone. Accordingly, the damage of the components otherwise caused by an inrush current can be prevented while preventing the complication of the configuration. Besides, since the current command value V1 is set to a value smaller than the value corresponding to the maximum current value in the safe operating area of the switching element Q, a second breakdown phenomenon does not occur in the switching element Q, so that the switching element Q can be efficiently used.

Furthermore, since the switching element Q is a silicon carbide static induction transistor, for using a silicon carbide static induction transistor in an active region, it is more preferable to use a static induction transistor than a MOSFET having a gate oxide film.

The present invention has been described on the basis of the embodiment so far, but it is noted that the present invention is not limited to the above-described embodiment but may be modified and changed without departing from the scope of the present invention. For example, although the relay switch SW is provided on the first connecting line L1 and the current limiting circuit 10 is provided on the second connecting line L2 in the present embodiment, the present invention is not limited to this configuration but the relay switch SW may be provided on the second connecting line L2 with the current limiting circuit 10 provided on the first connecting line L1.

Besides, the inrush current limiting circuit 1 of the present embodiment may be configured as follows: First, in the inrush current limiting circuit 1 of the present embodiment, in a second half of the period from the time when the relay switch SW is turned on until the charging of the inverter capacitor C is completed (specifically, Time 0.1 sec to 0.2 sec in FIG. 3), the rated power of the switching element is excessive performance. In other words, it is necessary to set the maximum power of the switching element Q in the SOA to a value corresponding to the maximum power applied to the switching element Q at the beginning of the inrush current (that is, 110 W in FIG. 3). Therefore, it is necessary to incorporate, into the inrush current limiting circuit 1, a switching element Q having the maximum rated power in accordance with the beginning of the inrush current, but in the second half of the period until the charging of the inverter capacitor C is completed, such a maximum power in the SOA is not necessary and is excessive performance.

On the other hand, if the maximum power of the switching element Q in the SOA is reduced, there arises a problem in which the period until the charging of the inverter capacitor C is completed becomes longer. Therefore, the following configuration may be employed.

Figure 4:
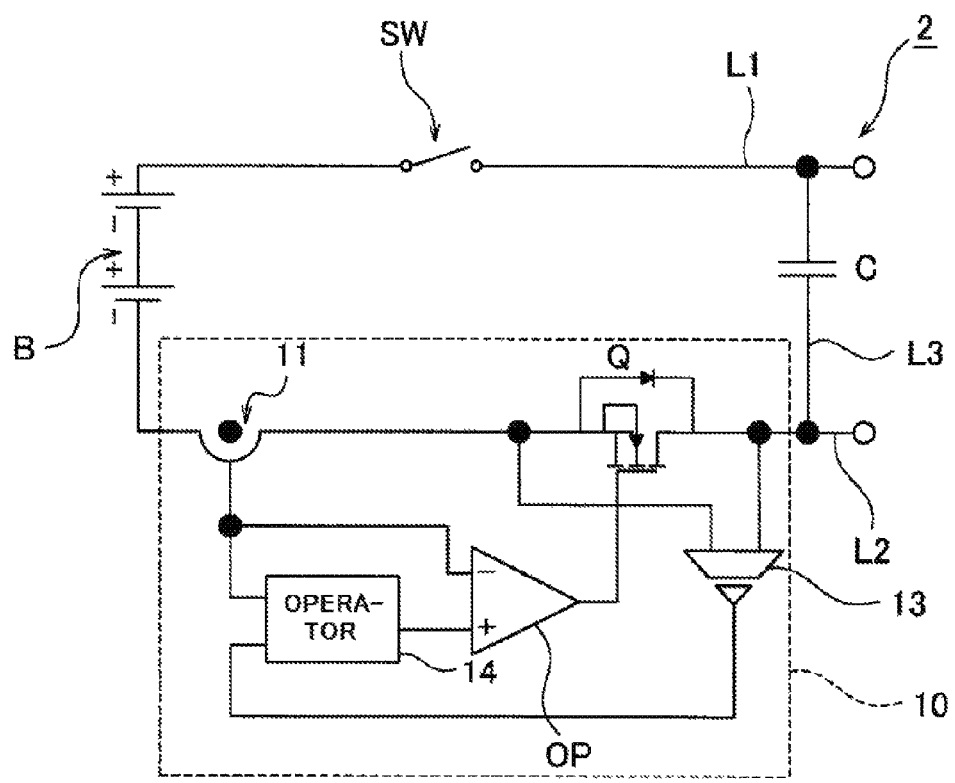
FIG. 4 is a circuit diagram illustrating an inrush current limiting circuit according to a modification of the embodiment.

FIG. 4 is a circuit diagram illustrating an inrush current limiting circuit 2 according to a modification of the present embodiment. As illustrated in FIG. 4, the inrush current limiting circuit 2 includes a voltage sensor 13 and an operator 14.

The voltage sensor 13 outputs, to the operator 14, a signal corresponding to a voltage difference between both the ends of the switching element Q. The operator 14 generates a current command value in accordance with the signal corresponding to the voltage difference between both the ends of the switching element Q detected by the voltage sensor 13, and outputs it to the non-inverting input terminal of the operational amplifier OP. In other words, the operator 14 calculates, on the basis of a signal from the voltage sensor 13 and a signal from the current sensor 11, a current command value for making constant a product of the current value flowing through the switching element Q and the voltage difference between both the ends of the switching element Q, and outputs it to the non-inverting input terminal of the operational amplifier OP.

Such a current command value is, similarly to the above-described current command value, set to a voltage value smaller than a voltage value corresponding to a value not exceeding the SOA of the switching element Q in the period from the time when the relay switch SW is turned on until the charging of the inverter capacitor C is completed. Besides, in the modification, the current command value is set to a value for making constant the product of the current value flowing through the switching element Q and the voltage difference between both the ends of the switching element Q as described above. Therefore, the power applied to the switching element Q is constant, and hence, the power applied to the switching element Q in the whole period from the time when the relay switch SW is turned on until the charging of the inverter capacitor C is completed can be made constant. As a result, the following effect can be exhibited.

Figure 5A:
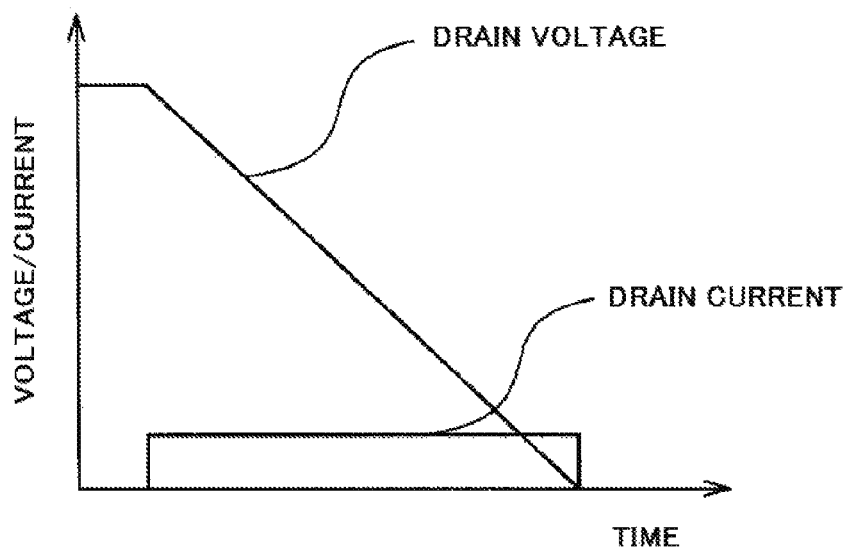
Figure 5B:
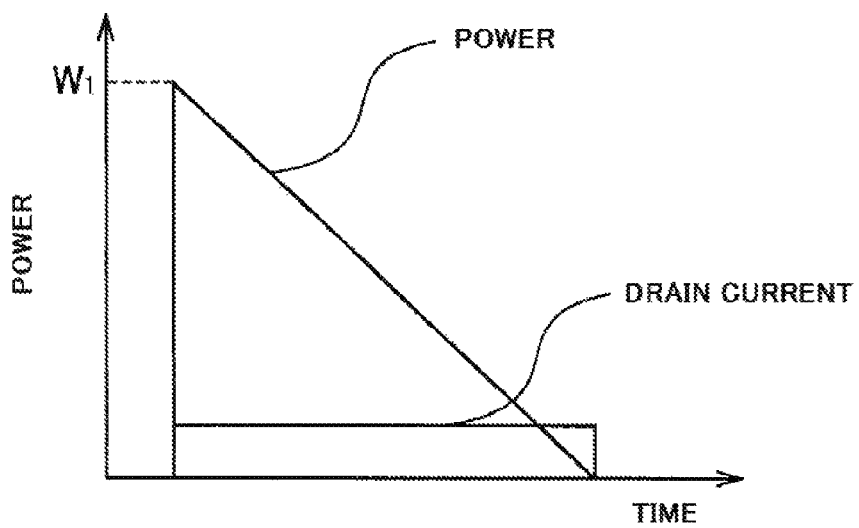

FIG. 5A and FIG. 5B are diagrams illustrating the power in the inrush current limiting circuit 1 of the present embodiment, in which FIG. 5A illustrates the drain voltage and the drain current and FIG. 5B illustrates the power. As illustrated in FIG. 5A, the drain current is substantially constant in the whole period from the time when the relay switch SW is turned on until the charging of the inverter capacitor C is completed. On the contrary, the drain voltage is high at the initial stage and becomes lower as the inverter capacitor C is charged. Therefore, as illustrated in FIG. 5B, the power corresponding to the product of the drain voltage and the drain current has a large value W1 at the initial stage and becomes smaller as the inverter capacitor C is charged.

Figure 6A:
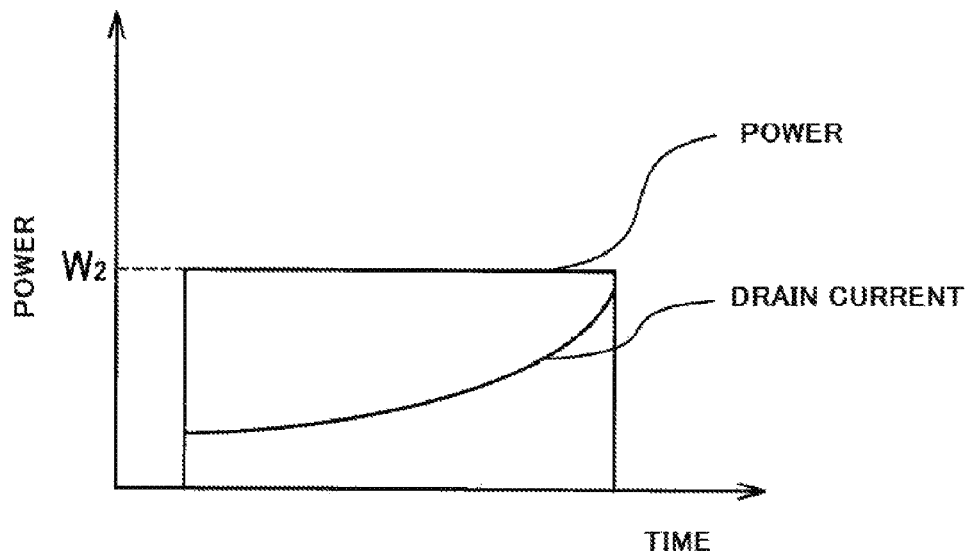
Figure 6B:
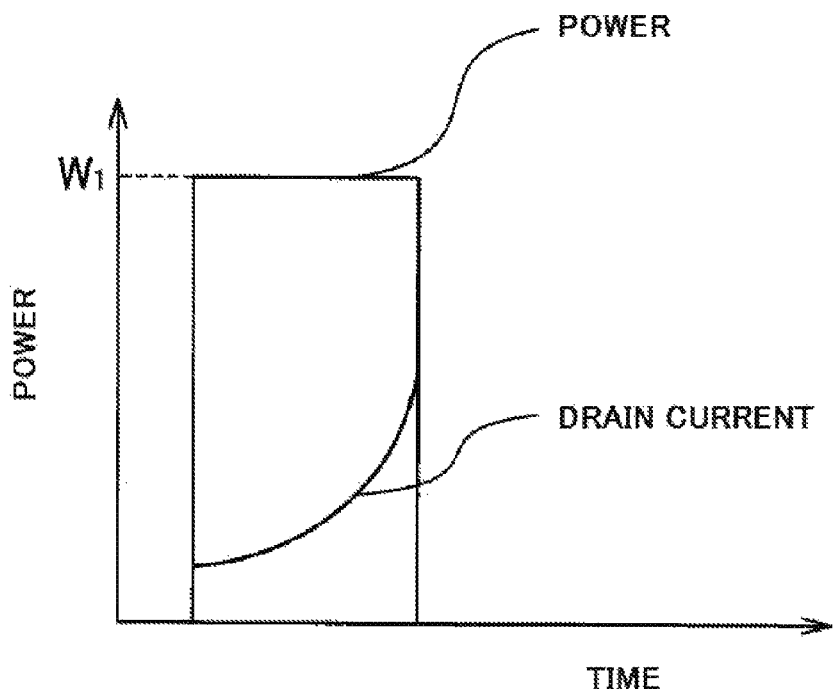

FIG. 6A and FIG. 6B are diagrams illustrating a power in the inrush current limiting circuit 2 of the modification, in which FIG. 6A illustrates a first example and FIG. 6B illustrates a second example. If a current command value for making constant the product of the current value flowing through the switching element Q and the voltage difference between both the ends of the switching element Q is input to the operational amplifier OP, the power is, for example, as illustrated in FIG. 6A. Specifically, the power applied to the switching element Q in the whole period from the time when the relay switch SW is turned on until the charging of the inverter capacitor C is completed is substantially constant at a value W2, but is not high in the initial stage and does not become smaller as the inverter capacitor C is charged. Therefore, a switching element Q having the maximum power in the SOA of W2 may be incorporated into the inrush current limiting circuit 2, and thus, the problem of the excessive performance is solved.

Alternatively, as illustrated in FIG. 6B, a current command value for attaining the power of a value W1 substantially constant in the whole period may be input to the operational amplifier OP. Thus, the problem in which the switching element Q has excessive performance in the second half of the period is solved, and in addition, the time necessary for charging the inverter capacitor C can be reduced.

Figure 7:
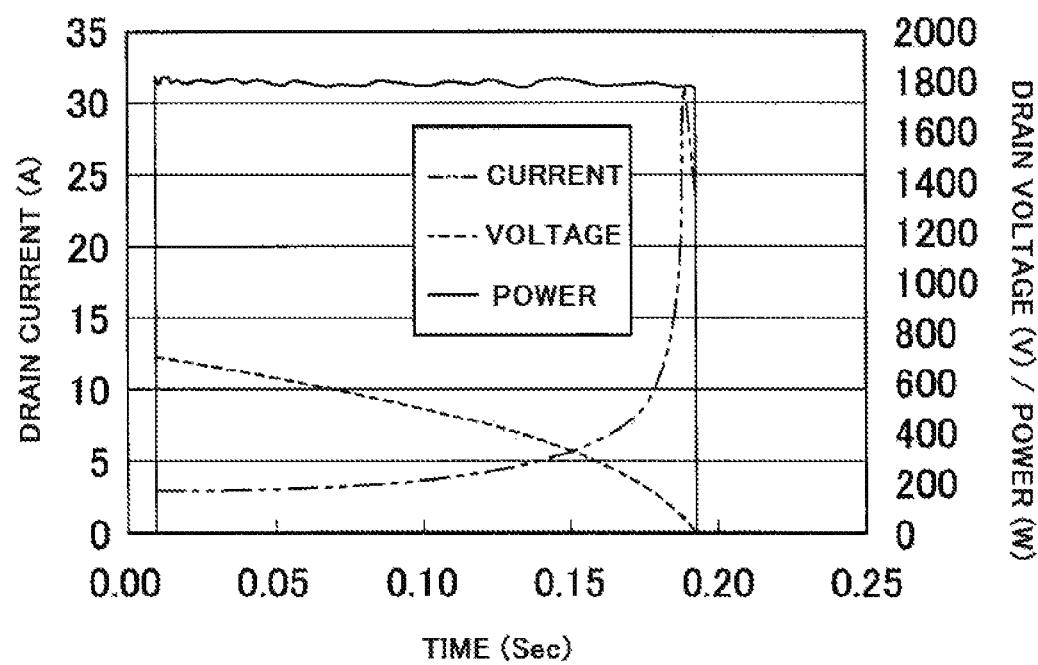
FIG. 7 is a graph illustrating a current, a voltage and a power of a switching element of the modification.

FIG. 7 is a graph illustrating the current, the voltage and the power of the switching element Q of the modification. As illustrated in FIG. 7, a current command value for retaining the power of the switching element Q at 1800 W is input to the operational amplifier OP. Specifically, a current command value for attaining a drain current of about 2.5 A and a drain voltage slightly higher than 700 V when the relay switch SW is in an on state is input to the operational amplifier OP. The power of the switching element Q at this point is about 1800 W.

Besides, at time 0.10 sec (with the relay switch turned on at time 0.01 sec), the drain current becomes about 3.5 A and the drain voltage becomes slightly higher than 500 V, and at time 0.15 sec, the drain current becomes slightly higher than 5 A and the drain voltage becomes about 350 V. Then, immediately before time 0.19 sec (when the charging is completed) the drain current becomes substantially 1 A and the drain voltage becomes about 1800 V.

The operator 14 is configured to calculate current command value data for realizing such current, voltage and power. Therefore, a state, as in the case where the current command value is a constant value, where the power of the switching element Q is high in the first half of the period from the time when the relay switch SW is turned on until the charging of the inverter capacitor C is completed and is low in the second half can be avoided, and the power can be made substantially constant through the whole period. Accordingly, the excessive (wasteful) performance of the maximum power of the switching element Q in the SOA can be avoided, and it is possible to achieve at least one of suppression of the maximum power of the switching element Q in the SOA and shortening of the period necessary for completing the charging of the inverter capacitor C.

Furthermore, since the above-described operator 14 is provided, a current command value can be calculated by actually monitoring a voltage difference of the switching element Q, and for example, it is possible to cope with the change or the like of resistance values of the respective components depending on the temperature environment where the inrush current limiting circuit 2 is used, and hence, the power applied to the switching element Q can be more precisely retained constant.

Figure 8:
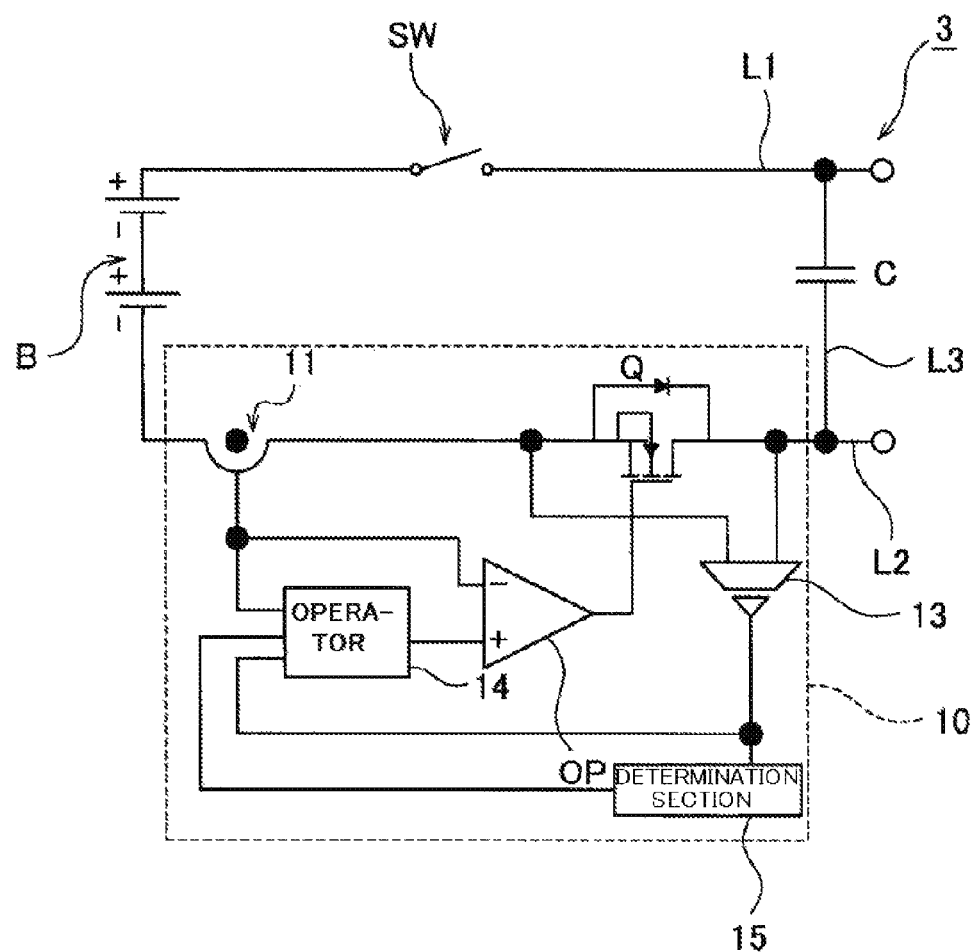
FIG. 8 is a circuit diagram illustrating an inrush current limiting circuit according to a second modification of the embodiment.

FIG. 8 is a circuit diagram illustrating an inrush current limiting circuit 3 according to a second modification of the present embodiment. The inrush current limiting circuit 3 of the second modification illustrated in FIG. 8 includes a determination section 15 in addition to the components of the above-described modification.

The determination section 15 determines, on the basis of the signal supplied from the voltage sensor 13, whether or not the charging of the inverter capacitor C has been completed. Besides, if it is determined that the charging of the inverter capacitor C has been completed, the determination section 15 transmits a corresponding signal to the operator 14.

Besides, in a third modification, if it is determined by the determination section 15 that the charging of the inverter capacitor C has been completed, the operator 14 places the switching element Q in a completely on state by changing the current command value to be higher than in the period from the time when the relay switch SW is turned on until the charging of the inverter capacitor C is completed.

In this manner, there is no need to determine the completion of the charging of the inverter capacitor C on the basis of the elapse of time (for example, slightly shorter than 0.2 sec) as in the above-described embodiment and modification, but an actual voltage difference of the switching element Q can be used for the determination, and hence the switching element Q can be placed in a completely on state at more precise timing.

Incidentally, into the inrush current limiting circuit 1 of the present embodiment, the techniques of the modification and the second modification may be incorporated, or a part of the techniques may be incorporated.

Now, the characteristics of the embodiment of the inrush current limiting circuit of the present invention will be simply summarized as the following [1] to [5],

[1] An inrush current limiting circuit, including:
a first connecting line (L1) connecting a positive terminal of a battery (B) and an electrical load to each other;
a second connecting line (L2) connecting a negative terminal of the battery and the electrical load to each other;
a capacitor (inverter capacitor C) having one electrode connected to the first connecting line, and another electrode connected to the second connecting line;
a switch (relay switch SW) provided on a first line out of the first and the second connecting lines; and
a current limiting circuit (10) provided on a second line out of he first and second connecting lines,
in which the current limiting circuit includes: a current sensor (11) provided on the second line; an operational amplifier (OP) receiving, at an inverting input terminal, a signal in accordance with a detection value obtained by the current sensor, and receiving a current command value at a non-inverting input terminal; and a switching element (Q) provided on the second line, receiving an output signal from the operational amplifier at a control terminal, and performing a switching operation in accordance with the output signal, and in a period from time when the switch is turned on until charging of the capacitor is completed, the current command value is set to a value smaller than a value corresponding to a smallest one of rated currents of components included in the circuit, and set to a value smaller than a maximum current value in a safe operating area of the switching element.

[2] The inrush current limiting circuit according to [1] above, in which the switching element is a silicon carbide static induction transistor.

[3] The inrush current limiting circuit according to [1] above, in which a product of a current value flowing through the switching element and a voltage difference between ends of the switching element is set to a constant value.

[4] The inrush current limiting circuit according to [3] above, further including:
a voltage sensor (13) detecting the voltage difference between the ends of the switching element; and
an operator (14) calculating, on the basis of a signal from the voltage sensor and a signal from the current sensor, the current command value for making constant the product of the current value flowing through the switching element and the voltage difference between the ends of the switching element, and outputting the calculated current command value to the non-inverting input terminal of the operational amplifier.

[5] The inrush current limiting circuit according to [4] above, further including a determination section (15) determining, on the basis of the signal from the voltage sensor, whether or not the charging of the capacitor has been completed,
in which if it is determined by the determination section that the charging of the capacitor has been completed, the operator places the switching element in a completely on state by changing the current command value to be higher than in the period from the time when the switch is turned on until the charging of the capacitor is completed.

The present invention has been described in detail with reference to the specific embodiment, and it is obvious for those skilled in the art that various changes and modifications can be made without departing from the spirit and scope of the present invention.

According to the present invention, a component can be prevented from being damaged by an inrush current while preventing complication of configuration. The present invention having this effect is useful for an inrush current limiting circuit.

What is claimed is:
1. An inrush current limiting circuit, comprising;
a first connecting line connecting a positive terminal of a battery and an electrical load to each other;
a second connecting line connecting a negative terminal of the battery and the electrical load to each other;
a capacitor having one electrode connected to the first connecting line, and another electrode connected to the second connecting line;
a switch provided on a first line out of the first and the second connecting lines; and
a current limiting circuit provided on a second line out of the first and second connecting lines, wherein the current limiting circuit includes: a current sensor provided on the second line; an operational amplifier receiving, at an inverting input terminal, a signal in accordance with a detection value obtained by the current sensor, and receiving a current command value at a non-inverting input terminal; and a switching element provided on the second line, receiving an output signal from the operational amplifier at a control terminal, and performing a switching operation in accordance with the output signal, and in a period from time when the switch is turned on until charging of the capacitor is completed, the current command value is set to a value smaller than a value corresponding to a smallest one of rated currents of components included in the circuit, and set to a value smaller than a maximum current value in a safe operating area of the switching element.

2. The inrush current limiting circuit according to claim 1, wherein the switching element is a silicon carbide static induction transistor.

3. The inrush current limiting circuit according to claim 1, wherein a product of a current value flowing through the switching element and a voltage difference between ends of the switching element is set to a constant value.

4. The inrush current limiting circuit according to claim 3, further comprising:

a voltage sensor detecting the voltage difference between the ends of the switching element: and an operator calculating, on the basis of a signal from the voltage sensor and a signal from the current sensor, the current command value for making constant the product of the current value flowing through the switching element and the voltage difference between the ends of the switching element, and outputting the calculated current command value to the non-inverting input terminal of the operational amplifier.

5. The inrush current limiting circuit according to claim 4, further comprising a determination section determining, on the basis of the signal from the voltage sensor, whether or not the charging of the capacitor has been completed, wherein if it is determined by the determination section that the charging of the capacitor has been completed, the operator places the switching element in a completely on state by changing the current command value to be higher than in the period from the time when the switch is turned on until the charging of the capacitor is completed.

* * * * *